United States Patent [19]

Rasiuk

[11] Patent Number: 4,815,284

[45] Date of Patent: Mar. 28, 1989

[54] EXHAUST MANIFOLD DEVICE

[75] Inventor: Thomas Rasiuk, LaPorte, Ind.

[73] Assignee: Stanley Sakowicz, Brookfield, Ill.; a part interest

[21] Appl. No.: 655,292

[22] Filed: Sep. 24, 1984

Related U.S. Application Data

[63] Continuation of Ser. No. 404,585, Aug. 2, 1982, abandoned, which is a continuation of Ser. No. 93,388, Nov. 13, 1979, abandoned.

[51] Int. Cl.$^4$ .................................................. F01N 3/30
[52] U.S. Cl. .................. 60/293; 137/543.17; 137/543.21
[58] Field of Search ................... 60/293, 307; 137/526, 137/543.17, 543.21

[56] References Cited

U.S. PATENT DOCUMENTS

| | | | |
|---|---|---|---|
| 1,828,967 | 10/1931 | Hewitt | 137/543.21 |
| 3,390,520 | 7/1968 | Mattson | 60/293 |
| 3,455,106 | 7/1969 | Flint | 60/293 |
| 3,456,684 | 7/1969 | Sochting | 137/543.17 |
| 3,877,222 | 4/1975 | Scherenberg | 60/307 |

FOREIGN PATENT DOCUMENTS

12,073   6/1905   United Kingdom ............ 137/543.17

*Primary Examiner*—Douglas Hart
*Attorney, Agent, or Firm*—Trexler, Bushnell, Giangiorgi & Blackstone, Ltd.

[57] ABSTRACT

There is disclosed an assembly for mounting on an exhaust manifold of an internal combustion engine to induct air into the exhaust manifold during the low pressure portion of the exhaust pulses of the engine. The assembly includes a stem section adapted to be connected to the exhaust manifold which includes a stem passage. A hollow cylindrical member is connected to the stem section to form a valve chamber which houses an improved valve arrangement. The valve arrangement includes a coiled spring which extends into the valve chamber, a valve seat, and a valve member disc disposed between the coiled spring and the valve seat. The disc is supported by the coiled spring which urges the disc against the valve seat for closing the valve in the absence of manifold pressure. During the negative pressure portions of the exhaust pulse waves, the disc is displaced away from the valve seat for opening the valve and inducting air into the manifold. During the positive pressure portions of the exhaust pulse waves, the disc is displaced toward and seats against the valve seat for closing the valve. The assembly further includes a pump means extending over the valve chamber for pumping air into the opened valve during the negative pressure portions of the exhaust pulse waves.

14 Claims, 3 Drawing Sheets

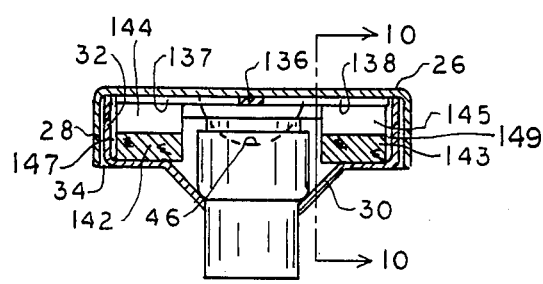
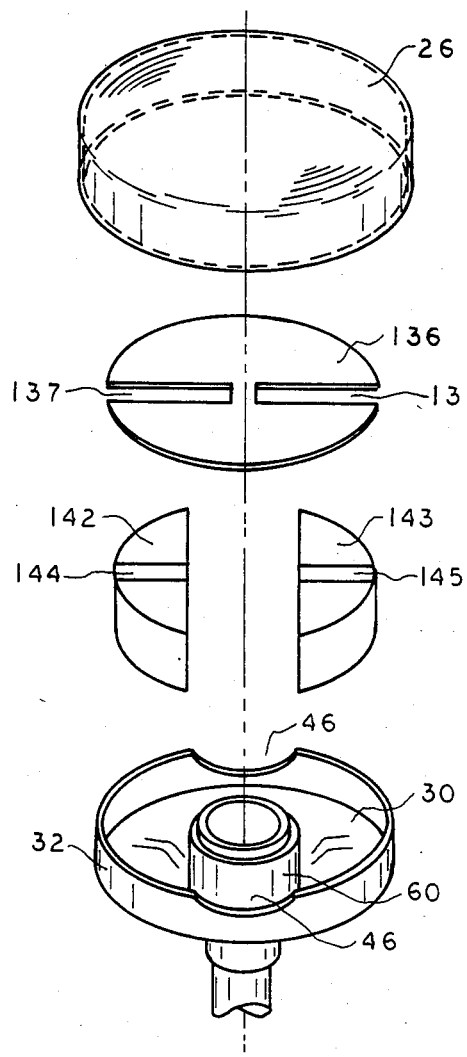
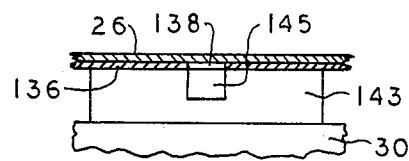
FIG. 9
FIG. 10
FIG. 8

EXHAUST MANIFOLD DEVICE

This application is a continuation of application Ser. No. 404,585, filed Aug. 2, 1982, which is a continuation of application Ser. No. 093,388, filed Nov. 13, 1979 both abandoned.

BACKGROUND OF THE INVENTION

The present invention is generally directed to an accessory for an internal combustion engine, and more particularly to an assembly for mounting on an exhaust manifold of an engine to induct air into the exhaust manifold.

During the operation of an internal combustion engine, gases resulting from an explosion in a cylinder of the engine are expelled from the cylinder in an initial high pressure pulse or wave. It has been determined that the initial high pressure wave or pulse has a relatively long duration, and is followed by a series of alternating low and high pressure pulses of shorter duration. A series of alternating high and low pressure waves is formed in the exhaust manifold each time an exhaust valve for any one of a plurality of engine cylinders is opened. During the high pressure pulses, combustion products or exhaust gases are expelled from the cylinders of the engine. However, during the low pressure pulses, the mainly noncombustible exhaust gases are drawn back into the cylinders. These exhaust gases are often retained in the cylinder when the exhaust valve closes and the gases substantially dilute the air-fuel mixture for the next cycle of operation. This dilution of the air-fuel mixture with largely noncombustible exhaust gases significantly retards combustion within the cylinder on the succeeding power stroke.

The quantity of largely noncombustible exhaust gases which are drawn into the cylinder during a low pressure pulse or wave can be substantially reduced by inducting air into the exhaust manifold during the low pressure pulse. The induced air dilutes the noncombustible exhaust gases retained in the cylinders, and further serves to displace a volume of the noncombustible exhaust gases. As a result, the induced air increases the power and efficiency of the engine by reducing carbon deposits and promoting more complete fuel combustion. Experience has even shown that the inducted air actually cleans up the carbon in an internal combustion engine.

Devices to promote the induction of air into an exhaust manifold as described above are known in the art. One such device, for example, is shown and described in Flint U.S. Pat. No. 3,455,106 which issued on July 15, 1969. The device there shown and described includes a stem section having a longitudinal passageway therein. One end of the stem section is adapted to be connected to the exhaust manifold and the other end of the stem section supports a check valve. The check valve includes a plurality of valve members which float with respect to a valve seat for opening and closing the valve during the alternating high and low pressure waves. The floating action of the valve members was found to provide a highly responsive and sensitive check valve necessary for proper operation of such a device due to the fact that the positive and negative pressure pulse waves set up in the exhaust system of an engine occur in rapid succession. For example, a four-cylinder four-stroke engine, which is operating at 1800 rpm, has fifteen openings and closings per second of the exhaust valve associated with each cylinder. Therefore, the four-cylinder engine sets up sixty series of high and low pressure pulses in the exhaust manifold per second. Since each series of pulses includes a plurality of high and low pressure peaks and valleys, the check valve assembly must operate far in excess of sixty times a second when the engine is operating at 1800 rpm.

While the aforementioned check valve disclosed in U.S. Pat. No. 3,455,106 has made significant advances in the art, the present invention provides further improvements. As will be fully described hereinafter, the manifold device of the present invention includes a new and improved check valve construction comprising substantially fewer moving parts than the previously described check valve which are supported by a spring for positively positioning the same within the valve in the absence of manifold pressure. However, in the presence of manifold pressure, and specifically the pressure waves established during the operation of the engine, the spring supporting the valve members allows the valve members to float, between an open and closed position to promote rapid opening and closing of the valve. Further, the device of the present invention includes a pump arrangement which is operative responsive to the exhaust pressure waves for pumping and directing air into the check valve during its operation. As a result, because the check valve of the present invention includes fewer moving parts which are positively positioned by the aforementioned spring, the device of the present invention experiences reduced wear during operation and is substantially more responsive to the alternating positive and negative exhaust pressures for inducting an increased volume of air into the exhaust manifold than heretofore possible. Furthermore, by virtue of the pump structure to be described hereinafter, a further increase in inducted air is promoted.

It is therefore a general object of the present invention to provide a new and improved assembly for mounting on an exhaust manifold of an engine to induct air into the exhaust manifold.

It is a further object of the present invention to provide such an assembly which includes a new and improved check valve arrangement which includes substantially fewer moving parts than check valves of the prior art, and a means for positively positioning the valve members prior to and during the operation of the check valve.

It is a still further object of the present invention to provide such an assembly which further includes a pump for forcing and directing air into the check valve during its operation, to thereby provide an increased volume of inducted air into the exhaust manifold.

The invention therefore provides an assembly for mounting on an exhaust manifold of an engine to induct air into the exhaust manifold. The assembly includes a stem section adapted to be connected to the exhaust manifold which stem section includes a continuous passage. A hollow cylindrical member is connected to the stem section and defines a valve chamber communicating with the stem section passage. Within the valve chamber there is disposed a valve means which includes a coiled spring extending into the valve chamber, an annular valve seat tightly received within the cylindrical member and having an annular valve seat surface facing the coiled spring, and valve member means including a solid disc arranged to be forced against the annular valve surface by the coiled spring in the absence of manifold pressure, and an apertured disc between the solid disc and the coiled spring for promoting movement of the solid disc into sealing engagement with and away from the annular valve seat surface in response to cyclically occurring positive and negative manifold pressures respectively. The discs are smaller in diameter dimension than the cylindrical member. A housing surrounds the valve chamber which is vented to external atmosphere for providing a volume of air in communication with the valve means. An air pump, including a flutter disc, is disposed within the housing across the valve chamber and is arranged for reciprocating movement responsive to variations in manifold pressure. As a result, when the manifold pressure is positive, the solid disc sealingly engages the annular valve seat surface for closing the valve and when the manifold pressure is negative, the solid disc is displaced from the annular valve seat surface for inducting air into the exhaust manifold while the flutter disk is resiliently displaced towards the valve chamber to draw a quantity of air into the housing for induction into the exhaust manifold during the next cycle of negative manifold pressure.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

FIG. 8 is an exploded perspective view of the head section of another exhaust manifold device embodying the present invention;

FIG. 9 is a partial cross-sectional view of the device of FIG. 8; and

FIG. 10 is a cross-sectional view taken along lines 10—10 of FIG. 9.

DESCRIPTION OF THE PREFERRED EMBODIMENT

Figure 1:
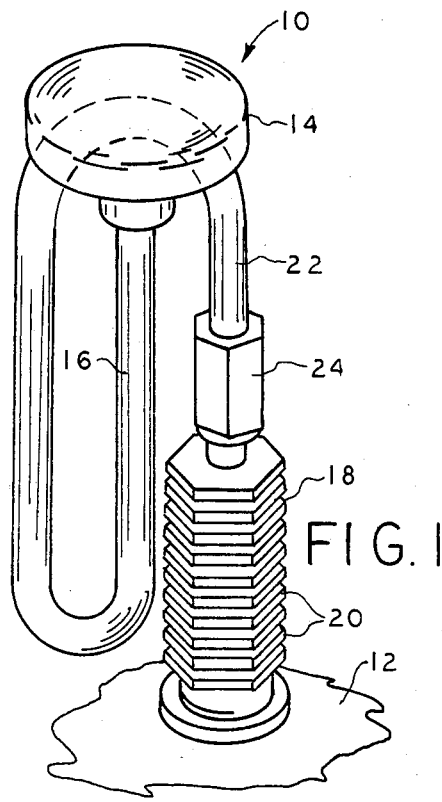
FIG. 1 is a perspective view of a preferred embodiment of the exhaust manifold device shown mounted on an exhaust manifold of an engine.

Referring now to FIG. 1, an exhaust manifold device 10 which embodies the present invention is shown mounted on an exhaust manifold 12 of an internal combustion engine. The exhaust manifold device 10 can advantageously be used with either two or four cycle or stroke engines having any desired number of cylinders. The exhaust manifold device 10 includes a head section 14 which is supported on a stem section 16. The stem section 16 includes a heat exchanger 18 which is adapted to be connected to the exhaust manifold 12. To that end, the heat exchanger 18 may include external threads (not shown) which are receivingly engaged with a threaded tap hole in the exhaust manifold 12. The heat exchanger 18 includes a plurality of fins 20 which dissipate heat conducted from the manifold 12 to prevent the head section 14 from being heated by relatively high temperatures and damaging a check valve assembly located in the head section. A neck or tube 22 is connected to the heat exchanger 18 by a threaded mounting nut 24.

Figure 2:
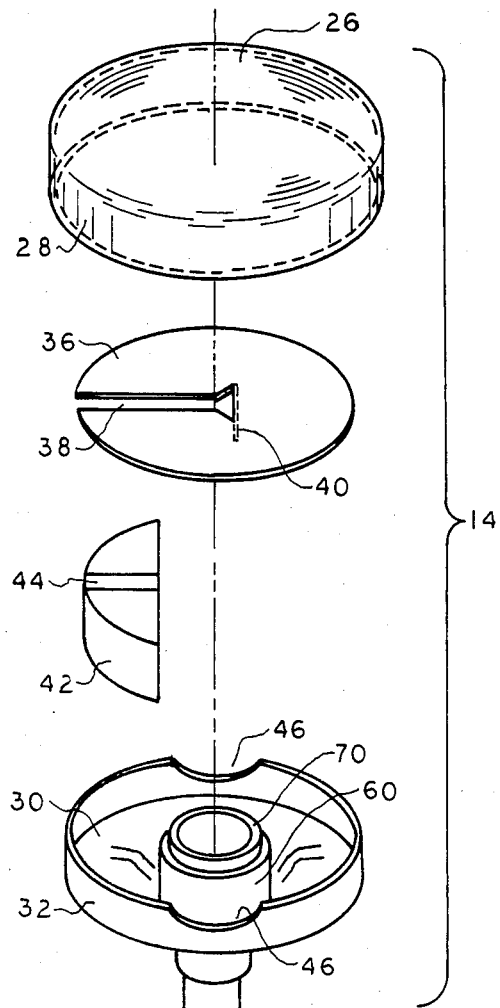
FIG. 2 is an exploded perspective view of the head section of the exhaust manifold device of FIG. 1.
Figure 3:
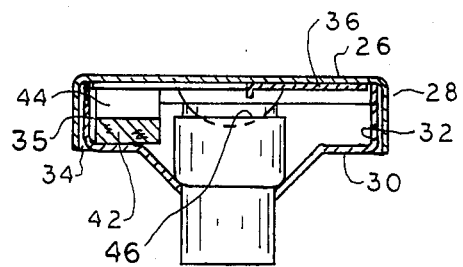
FIG. 3 is a partial cross-sectional view of the exhaust manifold device.

Referring now to FIGS. 2 and 3, it can be seen that the head section 14 includes a cap or cover 26 which has an annular side wall 28. The cover 26 is received over a base 30 and engages an upwardly turned annular side wall 32 of the base 30. The side wall 32 includes diametrically opposed arcuate recesses 46 and the cover 26 is dimensioned to be slightly greater in diameter dimension than the base 30. Thus, there is provided an annular passage 34 between the annular side walls 28 and 30 which is in communication with the recesses 46. As a result, the cover 26 and base 30 form a housing which is vented to the external atmosphere.

Extending across the housing in close juxtaposition to the cover 26 is a resilient disc member 36. The disc member 36 is formed from stainless steel sheet material or any other material which has resilient properties. A slot 38 is provided in the disc 36 which extends from the periphery thereof to its center and terminates in a downwardly turned baffle member 40 whose function will be described subsequently. The disc 36 is mounted within the housing by a mounting member 42 which has a recess 44. The mounting member 42 which may, preferably, be formed from cork material is secured to the disc member 36 at its periphery and is also secured close to the periphery of the base 30 to allow the disc member 36 to extend over the interior of the housing in closely spaced relation to the cover 26. The mounting member 42 is slightly spaced from the annular side wall 32 forming a passage 35 therebetween. The recess 44 of the mounting member 42 is aligned with the slot 38 formed in the disc 36.

Because the annular passage 34 is in communication with the recesses 46, because the recesses 46 are in communication with the recess 44 by the passage 35, and because the recess 44 is in turn in communication with the slot 38, air external to the housing may be drawn into the housing during operation of the device. Furthermore, during the operation of the device, a remnant portion of the resilient disc 36 beyond its mounting resiliently flutters between its normal position along the top of the housing and a downwardly flexed position toward the valve means from which intermediate space a small amount of air will be forcibly added to the negative pressure induced air for direction through the valve means when open. Hence, as will become more clear subsequently, the disc member 36 acts as a pump for pumping air into the check valve during its operation.

Figure 5:
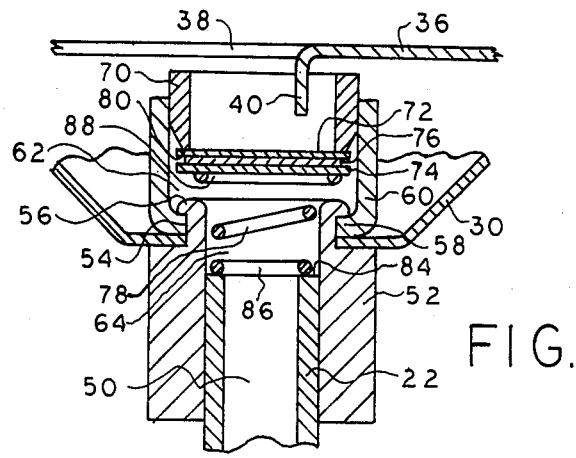
FIG. 5 is an enlarged sectional view illustrating the structure of the valve chamber, check valve assembly, and the air pump used in the exhaust manifold device, the various elements of the assembly being shown in the positions they attain in the absence of manifold pressure.

Referring now to FIG. 5, it can there be noted that the tubing 22 includes a central passage 50. Coupled to the tubing 22 is an annular coupling fixture 52. The fixture 52 has an external annular recess 54 defined by a flange 56. Within the recess 54 there are securely positioned the base member 30 of the housing and an annular flange 58 of a cylindrical member 60 which extends into the housing. The cylindrical member 60 is hollow and defines therein a valve chamber 62 for the check valve to be described hereinafter.

As can be further noted in FIG. 5, the coupling member 52 includes a central channel 64 which provides communication between the passageway 50 and the valve chamber 62. Hence, the valve chamber 62 is in communication with the passageway 50 and thus in communication with the interior of the exhaust manifold 12.

Figure 4:
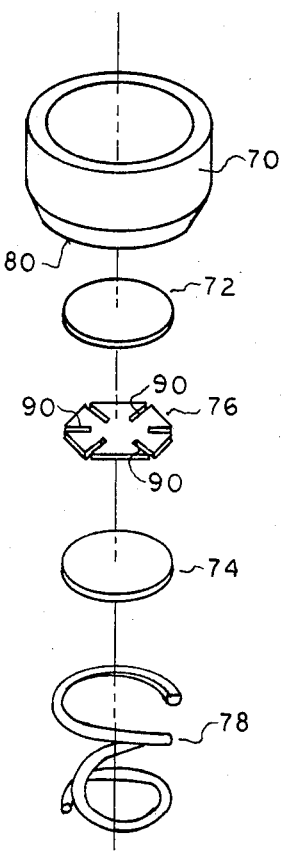
FIG. 4 is an exploded perspective view of the elements which comprise the improved check valve structure of the exhaust manifold device embodying the present invention.

A check valve assembly of the manifold device 10 includes a plurality of elements shown in exploded view in FIG. 4. By also making reference to FIG. 5, it will be noted that the check valve assembly includes a ring-shaped valve seat 70, a first valve member 72, a second valve member 74, a third valve member 76, and a coiled spring 78.

The valve seat 70 is tightly received within the cylindrical member 60 and has an annular valve seat surface 80 within the valve chamber 62 facing toward the coil spring 78. The coil spring 78 is supported by an annular surface 84 of the tubing 22 and extends through the central passage 64 of the coupling member 52 into the valve chamber 62. As can be best noted in FIG. 5, the end turns 86 and 88 of the coil spring 78 are arranged to define parallel planes which are also parallel to the plane defined by the annular valve seat surface 80. Also, the end turn 88 of the coil 78 is greater in diameter dimension than the other turns of the coil.

The first valve member 72 is in the form of a solid, circular disc and preferably is formed from stainless steel. It is dimensioned for being sealingly engaged against the entire periphery of the annular valve seat surface 80 of the valve seat 70, but of lesser dimension than the inner dimension of the cylindrical member 60 which defines the valve chamber 62.

The second valve member 74 is preferably identical to the first valve member 72, and takes the form of a circular solid disc. The third valve member 76 is disposed between the first and second valve members 72 and 74. As can best be seen in FIG. 4, the third valve member 76 is apertured and to that end includes a plurality of slots 90. The third valve member is also preferably hexagonally shaped with the slots 90 extending along a line from the center of the member 76 to the corners thereof. The third valve member 76 is further dimensioned to be slightly smaller in maximum dimension than the valve members 72 and 74.

The coil spring 78 is arranged to urge the valve members 72, 74 and 76 together with the first valve member 72 in sealing engagement with the annular valve seat surface 80 of the valve seat 70 in the absence of manifold pressure, for example, as when the engine is not running. The valve seat 70 is press-fit into the cylindrical member 60 to an extent such that it applies a force against the first valve member 72 in conjunction with the coil spring 78 to a pressure approximately equal to 2 or 3 inches of water. Hence, when the engine is not running, the check valve is closed with the first valve member 72 being sealingly engaged with the annular valve seat surface 80 of the valve seat 70.

As previously mentioned, the pressure waves caused by the opening of the engine cylinder valves create a series of positive and negative exhaust pulses or pressures. After the engine has been initially started, the rapidity of the alternating positive and negative exhaust pressures is such that the coil spring 78 is unable to follow the exhaust pressure fluctuations. As a result, the coil spring 78 serves to properly position the valve members 72, 74 and 76 prior to the operation of the engine. It also serves to restrict the distance of travel of the valve members 72, 74 and 76 during the operation of the engine. An internal combustion engine operates primarily in four modes: cruise; idle; deceleration, and full power. Under deceleration, the greatest amount of air is needed for induction into the manifold while under full power the least is required. By restricting the distance of travel of the valve members 72, 74, and 76, by varying amounts depending on the degree of negative manifold pressure, the spring 78 automatically adjusts the device to the engine operating mode.

Figure 6:
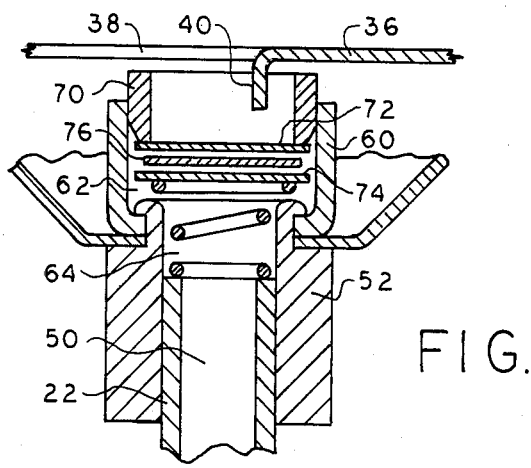
FIG. 6 is an enlarged sectional view similar to FIG. 5 but showing the elements of the assembly in the position which they attain responsive to positive manifold pressure.

Referring now to FIG. 6, the assembly is there shown in its condition when positive manifold pressure occurs. It will be noted that the first valve member 72 is sealingly engaged with the valve seat 70 by virtue of the positive pressure in the manifold which is communicated to the check valve through the passage 50 of tubing 22, the passage 64 of coupling member 52, and the valve chamber 62. It will also be noted that because the second valve member 74 is smaller in diameter dimension than the cylindrical member 60, the fluid exhaust pressure is allowed to pass between the valve member 74 and the cylindrical member 60 to the first valve member 72. Also, by virtue of the slot in the third valve member 76, the fluid positive pressure of the exhaust manifold is allowed to immediately be forced up against the under surface of the first valve member 72 to force the same into sealing engagement with the valve seat 70. Hence, the third valve member 76, by being slotted, promotes the displacement of the first valve member 72 between its closed position shown in FIG. 6 and its open position shown in FIG. 7. The second valve member may be formed from a fibrous material such as, for example, Melamine manufactured by National Vulcanizing Fiber Company of Broadview, Ill.

Immediately following the positive pressure wave of the exhaust, there is a negative pressure wave as previously explained. When the negative pressure wave occurs, the pressure above the first valve member 72 will be greater than the pressure below the first valve member 72 to cause the member 72 to be displaced from the annular valve seat surface 80 of the valve seat 70. When this occurs, the check valve is opened and air is inducted through the valve seat 70, around the valve members 72 and 74, around and through the third valve member 76, and into the tubing 22 for induction into the manifold through the passage 50. Also, it can be noted in FIG. 7 that the valve members 72, 74 and 76 are together with valve member 74 engaging the spring 78. This occurs because the transition from positive to negative pressures occur so rapidly and the slots 90 within member 76 are evacuated so that the valve members are pulled together and thus are in the displacement of valve member 72 away from the valve seat 80. Hence, as the exhaust pressure fluctuates between a positive and negative pressure, the first valve member 72 is rapidly displaced towards and into sealing engagement with the annular valve seat surface 80 and away from the valve seat 80.

Figure 7:
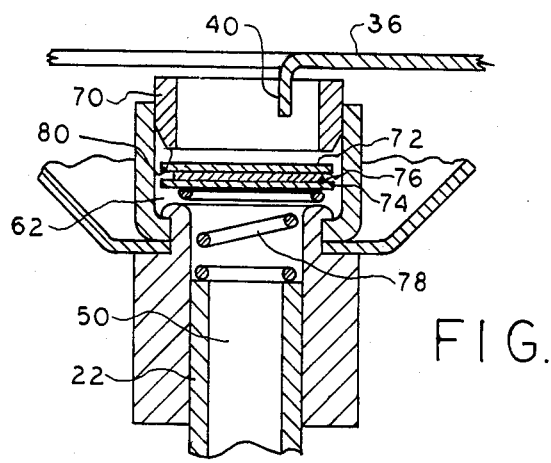
FIG. 7 is an enlarged sectional view, also similar to FIG. 5, but showing the assembly elements in the positions which they attain responsive to negative exhaust pressure.

All the while, the third valve member 76 serves to promote the displacement of the first valve member 72 between its closed position shown in FIG. 6 and its open position shown in FIG. 7. It can be further noted in FIG. 7 that the coil spring 78 assumes approximately the same extension into the valve chamber. This occurs spring 78 is not capable of responding fast enough to the fluctuations in manifold pressure and therefore assumes a substantially quiescent extension into the valve chamber 62 during the operation of the engine. As a result of the foregoing, the first valve member 72 which opens and closes the valve is displaced a very small distance to open and close the valve to thereby render the valve extremely sensitive to the pressure fluctuations within the exhaust manifold.

The spring, as previously mentioned, automatically adjusts the device to the engine operating mode. Under deceleration for example, when the most air is required to be inducted into the manifold, a maximum negative pressure is produced in the manifold. Hence, the spring will be compressed to its maximum extent under this condition to allow the greatest displacement between the valve seat 80 and the valve member 72. Hence, the greatest amount of air will then be inducted.

In contrast, during full power, the lowest negative pressure is developed in the manifold. Hence, the spring 78 will extend into the valve chamber 62 to its greatest extent thus limiting the maximum spacing between valve seat 80 and valve member 72 and thus causing the least amount of air to be inducted. Hence, not only does the spring 78 and valve members 72, 74, and 76 provide a very sensitive valve structure, the spring also renders the valve self adjusting to the various modes of operation of the engine with which it is employed.

As the first valve member 72 is opening and closing in response to the negative and positive manifold pressures, the resilient disc 36 disposed above the valve chamber 62 flutters slightly to force a small additional amount of air into the valve chamber when the valve is opened to as briefly described above with reference to FIGS. 2 and 3. The air remaining in the volume defined by valve seat 70 is forced by the rapid upward motion of valve member 72 under positive manifold pressure through slot 38 and into the space between resilient disc 36 and cover 26. Upon the next negative manifold pressure fluctuation, the resilient return of disc 36 to its undeformed position against cover 26 injects this additional air back through the slot 38 into the valve chamber 62, guided by the baffle 40 which extends into the ring-shaped valve seat 70. In essence, the partial housing formed by the cover 26 and base 30 forms a reservoir of air to be inducted into the manifold when the valve is opened, with a portion of air charged within the partial housing being inducted into the open valve each time the valve opens. Hence, resilient disc 36 serves as a "kicker" or pump for pumping a small quantity of additional air into the valve when it opens. The air inducted into the opened valve is immediately replaced within the housing by air flowing through the annular passage 34 between the annular side walls 28 and 32, and air passing through the recess 44 of the mounting member 42 into the slot 38 of the disc 36.

An alternative embodiment of pump or "kicker" arrangement for the device of the present invention is shown in FIGS. 8-10. Preferably, the alternative pump arrangement may be used in conjunction with the improved check valve arrangement previously described. The "kicker" or pump arrangement of FIGS. 8-10 includes a resilient disc 136 having a pair of diametrically opposed radial slots 137 and 138. The slots 137 and 138 extend from the periphery of the disc 136 towards the center thereof. The pump arrangement of FIG. 8 also includes a pair of mounting members 142 and 143 constructed in an identical manner to the mounting member 42 shown in FIG. 2. To that end, the mounting members 142 and 143 include recesses 144 and 145 respectively, and are also preferably formed from cork material. The disc 136 and mounting members 142 and 143 are received within the housing formed by the cover 26 and base 30 with the mounting members 142 and 143 being located within the housing in diametrically opposed relation with the disc 136 extending across the housing closely adjacent the top cover 26 between the mounting members 142 and 143. The slots 137 and 138 of the disc 136 are aligned with the recesses 144 and 145 respectively of the mounting members 142 and 143. Additionally, the slots 137 and 138 are positioned so that they are displaced by approximately 90° from the recesses 46 within the annular sidewall 32 of the base member 30. As will be noted in FIG. 9, as in the previous embodiment, an annular space 34 is provided between the annular sidewall 32 of the base and the annular sidewall 28 of the cover 26 and passages 147 and 149 are provided between the mounting members 142, 143 and the annular sidewall 32.

During the operation of the device, and more specifically as the check valve arrangement within the cylindrical member 60 opens and closes responsive to the alternating positive and negative manifold pressure pulses, the resilient disc 136 will flutter to force air into the opened valve. The fluctuation in pressure within the housing will cause the resilient disc 136 to flutter at its central portions to direct air into the opened valve. As the resilient disc 136 is displaced downwardly towards the valve as the valve opens, a quantity of air within the housing, and most notably within the recesses 144 and 145, will be directed by the slots 137 and 138 of the disc 136 into the opened valve. As the disc 136 is displaced away from the valve as the valve closes, a quantity of air is admitted to the housing to replace the air previously inducted into the manifold to provide a charged volume of air within the housing. The air is admitted into the housing through the annular passage 34, the recess 46, the passages 147 and 149, and the recesses 144 and 145 of the mounting members 142 and 143. Hence, as the resilient disc flutters, a quantity of air is directed into the open valve for induction into the manifold as the valve opens, and a quantity of air is admitted into the housing for charging the housing as the valve closes.

While a particular embodiment of the invention has been shown and described, modifications may be made, and it is therefore intended to cover in the appended claims all such modifications which fall within the true spirit and scope of the invention.

The invention is claimed as follows:

1. An assembly mountable on an exhaust manifold of an engine for inducting air into the exhaust manifold, said assembly comprising: a stem section adapted to be connected to the exhaust manifold and having a stem passage; wall means connected to said stem section to define a valve chamber communicating with said stem passage; and valve means including spring means supported by said stem section and extending into said valve chamber, valve seat means within said valve chamber and spaced from said spring means, and a first valve member between said spring means and said valve seat means, said first valve member being urged against said valve seat for closing said valve means in the absence of manifold pressure and arranged to be displaced away from and into engagement with said valve seat by negative and positive manifold pressure respectively transmitted from the manifold to said valve means by said stem section for inducting air into the manifold through said valve means in response to negative manifold pressure and closing said valve means in response to positive manifold pressure, and second and third valve members said second valve member being immediately adjacent said spring means, said third valve member being disposed between said first and second valve members, and said second and third valve members being of lesser dimension than said valve chamber, said third valve member including a plurality of openings to promote the displacement of said first valve member towards and away from said valve seat means; a housing vented to the atmosphere and communicating with said stem passage and a resilient disc contoured to the interior peripheral wall surface of the housing with a portion thereof trapped in the housing leaving a remnant portion extending across the housing and normally spaced above the valve chamber, and with the said remnant portion adapted to flutter by flexing under influence of manifold pressure fluctuations between its normal resiliently urged position across the housing above the valve chamber and a downwardly flexed position toward the valve chamber with air accumulation between the downwardly flexed remnant portion and the top of the housing for egress therefrom the passage to the valve chamber as a rapid small air addition to the negative manifold pressure induced air supply while the valve means is momentarily and alternately open at each return of the remnant portion in momentary and alternate sequence to its normal position.

2. An assembly as defined in claim 1 wherein said wall means includes a hollow cylindrical member, wherein said valve seat means comprises a ring-shaped member tightly received within said cylindrical member and having an annular valve seat surface facing towards said spring means, and wherein said valve member includes a circular disc dimensioned for sealing engagement with said annular valve seat surface but of less dimension than the inner dimension of said cylindrical member.

3. An assembly as defined in claim 2 wherein said spring means comprises a coiled spring and wherein the end loops of said coil spring define parallel planes which are also parallel to the plane defined by said annular valve seat surface for accurately positioning said valve member with respect to said annular valve seat surface.

4. An assembly as defined in claim 3 wherein the end loop of said coil spring which supports said valve member is larger in diameter dimension than the other loops of said coil spring.

5. An assembly as defined in claim 1 wherein said first valve member comprises a solid disc and wherein said third valve member comprises a slotted disc.

6. An assembly as defined in claim 5 wherein said third valve member comprises an hexagonally shaped disc wherein the maximum dimension of said third valve member is less than the dimension of said valve chamber, and wherein said slots within said third valve member extend radially outward from the center of said third valve member.

7. An assembly as defined in claim 6 wherein said third valve member is formed from fibrous sheet material.

8. An assembly as defined in claim 1 wherein said housing includes a base portion having an annular sidewall, a top cover having a downwardly turned annular sidewall, and wherein said cove is greater in diameter dimension than said bases to provide an annular space between said sidewalls for venting said housing.

9. An assembly as defined in claim 1 wherein said resilient disc includes a baffle directed towards said valve means for directing air into said valve means.

10. An assembly as define in claim 9 further including mounting means for said resilient disc, wherein said resilient disc includes a slot from the periphery thereof to said baffle, and wherein said mounting means includes a recess aligned with said disc slot, said recess and said disc slot co-acting for directing air against said baffle and into said valve means.

11. An assembly as defined in claim 10, said housing further comprising a base for partially enclosing said wall means, and wherein said resilient disc is circularly-shaped, wherein said baffle is substantially at the center of said resilient disc, and wherein said mounting means is arranged to mount said resilient disc at the periphery thereof to the periphery of said housing base to permit said resilient disc to be suspended over said valve means with said baffle aligned therewith.

12. An assembly as defined in claim 10 wherein said mounting means comprises an arcuate member which is generally a solid body away from said recess therein and of peripheral dimensions substantially similar to a minor fractional portion of said housing, said mounting means being mounted within said housing so as to substantially occupy said minor fractional portion thereof, and spaced apart from an interior wall surface of said housing; said mounting means engaging said trapped portion of said resilient disc against a facing interior wall portion of said housing for permitting said flexing of said remnant portion thereof.

13. An assembly as defined in claim 12 wherein said annular sidewall of said base portion includes cutout portions in communication with said annular space between said sidewalls of said top cover and base portion respectively.

14. An assembly as defined in claim 13 wherein said mounting member is located within said housing away from said openings in said base portion annular sidewall.

* * * * *